(12) United States Patent
Chen et al.

(10) Patent No.: US 11,760,349 B2
(45) Date of Patent: Sep. 19, 2023

(54) PARALLEL COMPUTING METHOD FOR MAN-MACHINE COORDINATED STEERING CONTROL OF SMART VEHICLE BASED ON RISK ASSESSMENT

(71) Applicant: TONGJI UNIVERSITY, Shanghai (CN)

(72) Inventors: Hong Chen, Shanghai (CN); Bin Li, Shanghai (CN); Qiang Meng, Shanghai (CN); Lin Zhang, Shanghai (CN); Yanjun Huang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 135 days.

(21) Appl. No.: 17/562,021

(22) Filed: Dec. 27, 2021

(65) Prior Publication Data

US 2022/0324443 A1 Oct. 13, 2022

(30) Foreign Application Priority Data

Mar. 31, 2021 (CN) .......................... 202110348942.9

(51) Int. Cl.
*B60W 30/12* (2020.01)
*B60W 10/04* (2006.01)
(Continued)

(52) U.S. Cl.
CPC ............ *B60W 30/12* (2013.01); *B60W 10/04* (2013.01); *B60W 10/20* (2013.01); *B60W 50/0098* (2013.01); *B60W 2050/0022* (2013.01); *B60W 2050/0031* (2013.01); *B60W 2510/222* (2013.01); *B60W 2520/06* (2013.01); *B60W 2520/10* (2013.01); *B60W 2520/12* (2013.01); *B60W 2520/14* (2013.01);
(Continued)

(58) Field of Classification Search
None
See application file for complete search history.

(56) References Cited

U.S. PATENT DOCUMENTS

2012/0314055 A1* 12/2012 Kataoka ................. G08G 1/167
382/104
2013/0006473 A1* 1/2013 Buerkle ............... B62D 15/025
701/41

(Continued)

*Primary Examiner* — Jonathan M Dager
(74) *Attorney, Agent, or Firm* — JCIP GLOBAL INC.

(57) ABSTRACT

A parallel computing method for man-machine coordinated steering control of a smart vehicle based on risk assessment is provided, comprising the following steps: building a lateral kinetic equation model of a vehicle; building a target function by targeting at minimizing an offset distance of a vehicle driving track from a lane center line and making a change in a front wheel steering angle and a longitudinal acceleration as small as possible in a driving process; building a parallel computing architecture of a prediction model and the target function, and employing a triggering parallel computing method; solving and computing a gradient with a manner of back propagation and using a gradient descent method to obtain an optimal control amount of the front wheel steering angle and an optimal control amount of the longitudinal acceleration; and computing a driving weight, obtaining a desired front wheel steering angle and completing real time control.

9 Claims, 9 Drawing Sheets

(51) Int. Cl.
  *B60W 10/20* (2006.01)
  *B60W 50/00* (2006.01)
(52) U.S. Cl.
  CPC ..... *B60W 2530/10* (2013.01); *B60W 2540/10* (2013.01); *B60W 2710/207* (2013.01); *B60W 2720/106* (2013.01)

(56) References Cited

U.S. PATENT DOCUMENTS

| | | | |
|---|---|---|---|
| 2019/0071080 A1* | 3/2019 | Shimizu | G06T 7/12 |
| 2019/0168804 A1* | 6/2019 | Bajpai | B60R 1/00 |
| 2021/0309221 A1* | 10/2021 | Alpert | G06V 10/82 |
| 2022/0144266 A1* | 5/2022 | Sachdev | B60W 30/12 |
| 2022/0153279 A1* | 5/2022 | Atsmon | B60W 50/0097 |
| 2023/0026680 A1* | 1/2023 | Kim | B60W 10/20 |
| 2023/0166743 A1* | 6/2023 | Heck | G05B 13/027 |
| | | | 701/26 |

* cited by examiner

| U | | $D_r$ | | | | |
|---|---|---|---|---|---|---|
| | | S | MS | M | MB | B |
| $D_h$ | S | S | S | MS | MS | M |
| | MS | S | S | MS | M | MB |
| | M | S | MS | M | MB | B |
| | MB | S | MS | M | B | B |
| | B | S | M | MB | B | B |

PARALLEL COMPUTING METHOD FOR MAN-MACHINE COORDINATED STEERING CONTROL OF SMART VEHICLE BASED ON RISK ASSESSMENT

CROSS-REFERENCE TO RELATED APPLICATION

This application claims the priority benefit of China application serial no. 202110348942.9, filed on Mar. 31, 2021. The entirety of the above-mentioned patent application is hereby incorporated by reference herein and made a part of this specification.

BACKGROUND

Technical Field

The present invention relates to the technical field of parallel computing and in particular, relates to a parallel computing method for man-machine coordinated steering control of a smart vehicle based on risk assessment.

Description of Related Art

Although great convenience is brought for traveling of people with the continuous development of an automobile, traffic environments for traveling of a vehicle become increasingly complicated with increasing ownership of automobiles year by year. A complicated traffic environment will increase mental burden and driving difficulties of a driver, thereby causing fatigue of the driver in a driving process easily and finally resulting in occurrence of a traffic accident. Therefore, reducing occurrence of traffic accidents by reducing a driving burden of a driver is one of the most effective methods.

With the development of sensor and communication techniques and perception fusion techniques, a smart vehicle also gets a prosperous development. Moreover, the man-machine coordinated control system in the smart vehicle can effectively aid safe driving of a driver, specifically reflected as reducing a driving burden of a driver on one hand and timely taking over a vehicle in case of a driver's misoperation. Although the man-machine coordinated system of the smart vehicle is an effective measure to reduce traffic accidents, a real time solution for an optimal front wheel steering angle rapidly based on risk assessment according to a present driver behavior and traffic state is a great challenge. It obstructs mass production of the man-machine coordinated system of the smart vehicle.

SUMMARY

The objective of the present invention is to overcome the existing defect of the prior art by providing a parallel computing method for man-machine coordinated steering control of a smart vehicle based on risk assessment.

The objective of the present invention can be realized through the following technical solution:

A parallel computing method for man-machine coordinated steering control of a smart vehicle based on risk assessment comprises the following steps:

S1: building a lateral kinetic equation model of a vehicle and obtaining a system discrete model of the vehicle;

S2: taking a road center line as an ideal driving track to minimize an offset distance of a vehicle driving track from a lane center line, and building a target function by making a change in a front wheel steering angle and a longitudinal acceleration as small as possible in a driving process;

S3: building a parallel computing architecture of a prediction model and the target function, and employing a triggering parallel computing method by the parallel computing architecture to synchronously compute the prediction model and the target function;

S4: solving and computing a gradient with a manner of back propagation and using a gradient descent method to optimize a control amount of a front wheel steering angle and a control amount of a longitudinal acceleration to obtain an optimal control amount of the front wheel steering angle and an optimal control amount of the longitudinal acceleration; and S5: computing a driving weight based on fuzzy logic, obtaining a desired front wheel steering angle according to the driving weight and completing real time control over man-machine coordinated steering of the smart vehicle.

Preferably, in the parallel computing architecture of the prediction model and the target function in the step S3, a symbol indicating that solution of the prediction model and the target function in a present computing step has been completed is used as a symbol of starting a prediction computing at a next step, thereby realizing parallel computing of the prediction model and the target function.

Preferably, the lateral kinetic equation model is:

$$\begin{cases} \dot{Y} = v_x \sin\varphi + v_y \cos\varphi \\ \dot{\varphi} = r \\ \dot{v}_y = -v_x r + \dfrac{2(C_f + C_r)v_y}{mv_x} + \dfrac{2r(aC_f - bC_r)}{mv_x} - \dfrac{2C_f}{m}\delta_f \\ \dot{r} = \dfrac{2v_y(aC_f - bC_r)}{I_z v_x} + \dfrac{2r(a^2 C_f + b^2 C_r)}{I_z v_x} - \dfrac{2aC_f}{I_z}\delta_f \\ \dot{X} = v_x \cos\varphi - v_y \sin\varphi \\ \dot{v}_x = v_y r + a_x \end{cases}$$

wherein m is a vehicle weight; r is a yaw velocity; $v_y$ is a vehicle lateral velocity; $v_x$ is a vehicle longitudinal velocity; $a_x$ is a vehicle longitudinal speed; $I_x$ is a rotational inertia of a vehicle about shaft z; a and b are respectively a distance from a vehicle centroid to a front shaft and a rear shaft of a vehicle; and wherein $C_f$ and $C_r$ respectively represent a cornering stiffness of a front wheel tire and a cornering stiffness of a rear wheel tire; $\delta_f$ is a front wheel steering angle of a vehicle; Y is a lateral displacement of a vehicle; and X is a vehicle longitudinal displacement.

Preferably, the lateral kinetic equation model selects a vehicle lateral displacement Y, a heading angle $\varphi$, a vehicle lateral velocity $v_y$, a yaw velocity r, a vehicle longitudinal displacement X and a vehicle longitudinal velocity $v_x$ as a state amount of a system, i.e. a state amount x=[Y $\varphi$ $v_y$ r X $v_z$]; a vehicle front wheel steering angle $\delta_f$ and a longitudinal acceleration $a_x$ as an input; and a vehicle lateral displacement Y as an output of a system.

Preferably, a system discrete model is obtained by discretization with a three-order three-segment Runge-Kutta formula in the step S1;

$$\begin{cases} k_1 = T_s f(x_k, u_k) \\ k_2 = T_s f\left(x_k + \frac{1}{2}k_1, u_k\right) \\ k_3 = T_s f(x_k - k_1 + 2k_2, u_k) \\ x_{k+1} = x_k + \frac{1}{6}(k_1 + 4k_2 + k_3) \end{cases}$$

wherein $k_1$, $k_2$ and $k_3$ are intermediate variables; $T_s$ is a discrete step size; $x_k$ is a state amount at moment k; $x_{k+1}$ is a state amount at moment k+1 and $u_k$ is a control amount at moment k.

Preferably, the target function J is:

$$J = \sum_{i=0}^{N-1}\left(\Delta U_{(k+i|k)} R \Delta U_{(k+i|k)}^T\right) + \sum_{i=1}^{N-1}\left((Y_{(k+i|k)} - r_{(k+1)})Q(Y_{(k+i|k)} - r_{(k+1)})^T\right) + \left(Y_{(k+N|k)} - r_{(k+1)}^*\right)P\left(Y_{(k+N|k)} - r_{(k+1)}^*\right)^T$$

wherein $\Delta U_{(k+i|k)}$ is a changing amount of a control amount in step i at moment k, N is a predictive step size, P is a weight matrix of a terminal, Q is a state weight matrix, R is a weight matrix of a control amount, $Y_{(k+i|k)}$ is a vehicle lateral displacement in step i at moment k, $r_{(k+1)}$ is a yaw velocity in step k+1 and $r_{(k+1)}*$ is a desired value of a yaw velocity in step k+1.

Preferably, a recurrence relationship between the lateral kinetic equation model and the target function is:

$$i = 0 \qquad J_0 = \sum_{i=0}^{N-1} \Delta U_{(k+i|k)} R \Delta U_{(k+i|k)}^T$$

$$x_{(k+1|k)} = f(x_{(k|k)}, U_{(k|k)})$$

$$i = 1 \qquad J_1 = J_0 + (Y_{(k+1|k)} - r_{(k+1)})Q(Y_{(k+1|k)} - r_{(k+1)})^T$$

$$x_{(k+2|k)} = f(x_{(k+1|k)}, U_{(k+1|k)})$$

$$\vdots$$

$$i = N-1 \quad J_{N-1} = J_{N-2} + (Y_{(k+N-1|k)} - r_{(k+1)})Q(Y_{(k+N-1|k)} - r_{(k+1)})^T$$

-continued $$x_{(k+N|k)} = f(x_{(k+N-1|k)}, U_{(k+N-1|k)})$$

$$i = N \qquad J = J_{N-1} + (Y_{(k+N|k)} - r_{(k+1)})P(Y_{(k+N|k)} - r_{(k+1)})^T$$

wherein J is a target function to be optimized, f is a lateral kinetic equation model, P is a weight matrix of a terminal, Q is a state weight matrix, R is a weight matrix of a control amount, $\Delta U_{(k+i|k)}$ is a changing amount of a control amount in step i at moment k, $x_{(k+i|k)}$ is a state amount prediction value in step i at moment k, $U_{(k+i|k)}$ is a control amount prediction value in step i at moment k, and $r_{(k+1)}$ is a yaw velocity in step k+1.

Preferably, the step S4 specifically comprises:

S41: building a plurality of storage units, each storage unit storing a related computing parameter;

S42: obtaining a gradient of a target function for an input amount based on back propagation according to the computing parameter stored in each storage unit; and S43: using a gradient descent method to optimize a control amount of a front wheel steering angle and a control amount of a longitudinal acceleration of a vehicle;

$$\begin{bmatrix} \delta_{f(k|k)}, \delta_{f(k+1|k)} \cdots \delta_{f(k+N_p-1|k)} \\ a_{x(k|k)}, a_{x(k+1|k)} \cdots a_{x(k+N_p-1|k)} \end{bmatrix}$$

wherein $\delta_{f(k|k)}$, $\delta_{f(k+1|k)}$ ... $\delta_{f(k+N_p-1|k)}$ $\delta_{f(k|k)}$, $\delta_{f(k|k+1)}$ ... $\delta_{f(k|k+N-1)}$ are respectively front wheel steering angles of step 0, 1 ... $N_p$−1 at moment k, and $a_{x(k|k)}$, $a_{x(k+1|k)}$ ... $a_{x(k+N_p-1|k)}$ is respectively a longitudinal acceleration of step 0, 1 ... $N_p$−1 at moment k, when a difference value between an output result of an optimized target function $J_k$ and a result of a target function $J_{k-1}$ of a previous step size is smaller than a set value or reaches limited optimization times or $\Delta J$ is zero, an optimization process is completed if one of the three conditions is satisfied and an optimal control sequence is $U_{(k)}*$;

$$a_{x(k|k)}*, a_{x(k+1|k)}* \ldots a_{x(k+N-1|k)}*,$$

wherein $U_{(k|k)}*$, $U_{k+1|k}*$ ... $U_{(k+N-1|k)}*$ is respectively a desired value of a control amount of step 0, 1 ... $N_p$−1 at moment k, $\delta_{f(k|k)}*$, $\delta_{f(k+1|k)}*$, ..., $\delta_{f(k+N-1|k)}*$ is respectively a desired value of a front wheel steering angle of step 0, 1 ... $N_p$−1 at moment k, and $a_{x(k|k)}*$, $a_{x(k+1|k)}*$ ... $a_{x(k+N-1|k)}*$ is respectively a desired value of a longitudinal acceleration of step 0, 1 ... $N_p$−1 at moment k, a computing formula of the optimal control sequence is represented as follows:

$$\delta_{f(k|k)}^* = \delta_{f(k-1|k-1)}^* - \frac{\partial J}{\partial \delta_{f(k|k)}}\Delta t \qquad a_{x(k|k)}^* = a_{x(k-1|k-1)}^* - \frac{\partial J}{\partial a_{x(k|k)}}\Delta t$$

$$\delta_{f(k+1|k)}^* = \delta_{f(k|k)}^* - \frac{\partial J}{\partial \delta_{f(k+1|k)}}\Delta t \qquad a_{x(k+1|k)}^* = a_{x(k|k)}^* - \frac{\partial J}{\partial a_{x(k+1|k)}}\Delta t$$

$$\vdots \qquad\qquad \vdots$$

$$\delta_{f(k+N-1|k)}^* = \delta_{f(k+N-2|k)}^* - \frac{\partial J}{\partial \delta_{f(k+N-1|k)}}\Delta t \quad a_{x(k+N-1|k)}^* = a_{x(k+N-2|k)}^* - \frac{\partial J}{\partial a_{x(k+N-1|k)}}\Delta t$$

wherein $\delta_{f(k-1|k-1)}*$ is an optimal front wheel steering angle of a previous moment, $a_{x(k-1|k-1)}*$ is an optimal longitudinal acceleration of a previous moment and $\Delta t$ is a control step size, $\delta_{f(k|k)}*$ in a first element of the obtained optimal control sequence $U_{(k)}*$ serves as an optimal control amount of a front wheel steering angle $\delta_d*(k)$ at moment k and participates in solution of a desired front wheel steering angle, and $a_{x(k|k)}*$ in a first element of the optimal control sequence $U_{(k)}*$ is a control amount of an optimal longitudinal acceleration at moment k for directly acting on an accelerator pedal.

Preferably, the step S5 specifically comprises:

S51: respectively computing a path offset risk and a driver operation risk of a vehicle, obtaining a path offset risk level according to a path offset risk membership function, and obtaining a driver operation risk level according to a driver operation risk membership function;

S52: building a driving weight membership function based on risk assessment and a driving weight map chart based on risk assessment, and obtaining a driving weight according to a path offset risk and a driver operation risk; and S53: computing a desired front wheel steering angle of moment k+1 according to a driving weight;

$$\delta(k+1)=\alpha*\delta_h(k+1)+(1-\alpha)*\delta_m(k+1)$$

wherein $\delta_h(k+1)$ is a driver desired front wheel steering angle at moment k+1, $\delta_m(k+1)$ is desired front wheel steering angle of a machine decision at moment k+1 and $\delta(k+1)$ is a front wheel steering angle executed by a desired steering system at moment k+1.

Preferably, a computing formula of the path offset risk is:

$$D_r=|y_{(k)}-R_{(k)}|$$

wherein $y_{(k)}$ is a lateral displacement of a smart vehicle at moment k and $R_{(k)}$ is a lateral displacement of a lane center line at moment k.

Preferably, a computing formula of the driver operation risk $D_h$ is:

$$D_h=|\delta_h(k)-\delta_d*(k)|$$

wherein $\delta_h(k)$ is a front wheel steering angle at moment k and $\delta_d*(k)$ is an optimal control amount of a front wheel steering angle at moment k.

Compared with the prior art, the method of the present invention for building the parallel computing architecture for parallel computing of each state amount in the prediction model and for parallel computing of the prediction model and the target function based on solution of an optimal front wheel steering angle and a control amount of a longitudinal speed shortens the time of solving model production control. In addition, the present invention shortens the time of solving a desired front wheel steering angle through the method for parallel computing of a path offset risk and a driver operation risk based on a risk assessment method. Therefore, the present invention improves real time property of man-machine coordinated steering control of the smart vehicle, such that the control system performs a function of reducing traffic accidents by being applied to a smart automobile.

DESCRIPTION OF THE EMBODIMENTS

The present invention is described in detail below with reference to the accompanying drawings and specific embodiments. It should be noted that the following descriptions of embodiments are merely illustrative in substance, as the present invention does not intend to limit its applicable objects or functions and the present invention does not limit the following embodiments:

Embodiments

Figure 1:
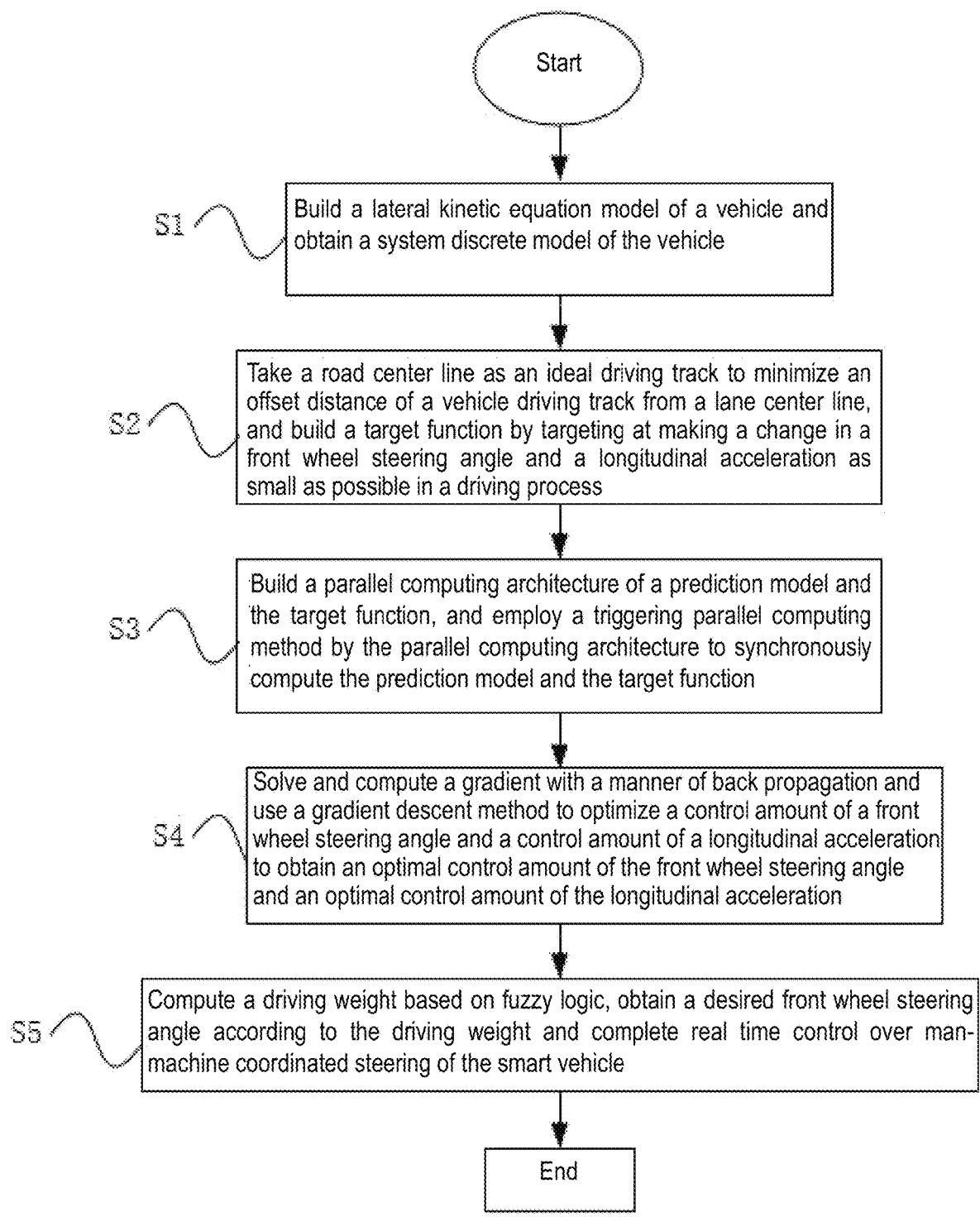
FIG. 1 is a flow chart of the present invention.
Figure 3:
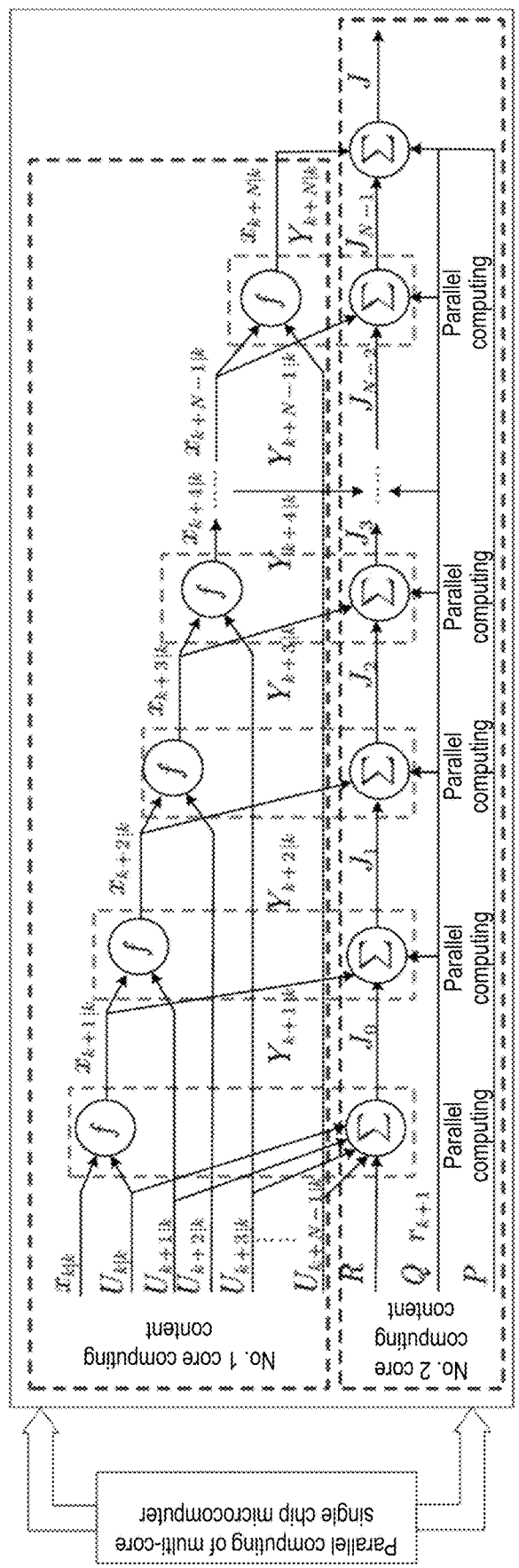
FIG. 3 is a parallel computing architecture for model prediction control of the present invention.
Figure 4:
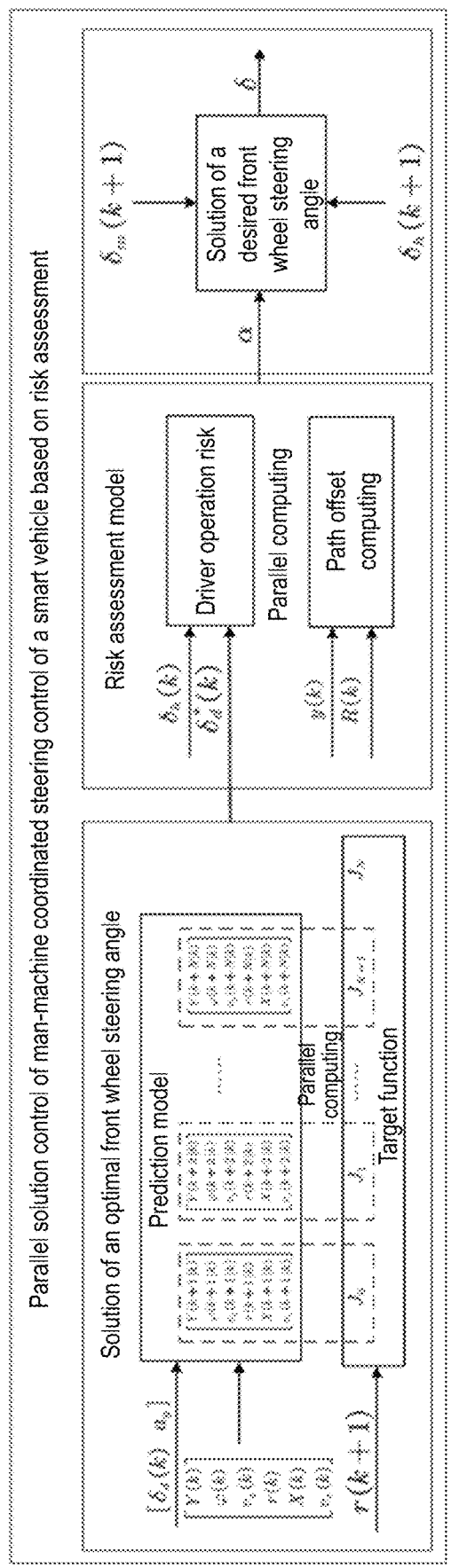
FIG. 4 is a parallel computing architecture for man-machine coordinated steering control of a smart vehicle based on risk assessment.

A parallel computing method for man-machine coordinated steering control of a smart vehicle based on risk assessment, as shown in FIGS. 1 and 3, comprises the following steps:

S1: building a lateral kinetic equation model of a vehicle and obtaining a system discrete model of the vehicle.

Specifically, the lateral kinetic equation model is:

$$\begin{cases} \dot{Y} = v_x\sin\varphi + v_y\cos\varphi \\ \dot{\varphi} = r \\ \dot{v}_y = -v_xr + \dfrac{2(C_f+C_r)v_y}{mv_x} + \dfrac{2r(aC_f-bC_r)}{mv_x} - \dfrac{2C_f}{m}\delta_f \\ \dot{r} = \dfrac{2v_y(aC_f-bC_r)}{I_zv_x} + \dfrac{2r(a^2C_f+b^2C_r)}{I_zv_x} - \dfrac{2aC_f}{I_z}\delta_f \\ \dot{X} = v_x\cos\varphi - v_y\sin\varphi \\ \dot{v}_x = v_yr + a_x \end{cases}$$

wherein m is a vehicle weight; r is a yaw velocity; $v_y$ is a vehicle lateral velocity; $v_x$ is a vehicle longitudinal velocity; $a_x$ is a vehicle longitudinal speed; $I_x$ is a rotational inertia of a vehicle about shaft z; a and b are respectively a distance from a vehicle centroid to a front shaft and a rear shaft of a vehicle; and wherein $C_f$ and $C_r$ respectively represent a cornering stiffness of a front wheel tire and a cornering stiffness of a rear wheel tire; $\delta_f$ is a front wheel steering angle of a vehicle; Y is a vehicle lateral displacement; and X is a vehicle longitudinal displacement.

Figure 2:
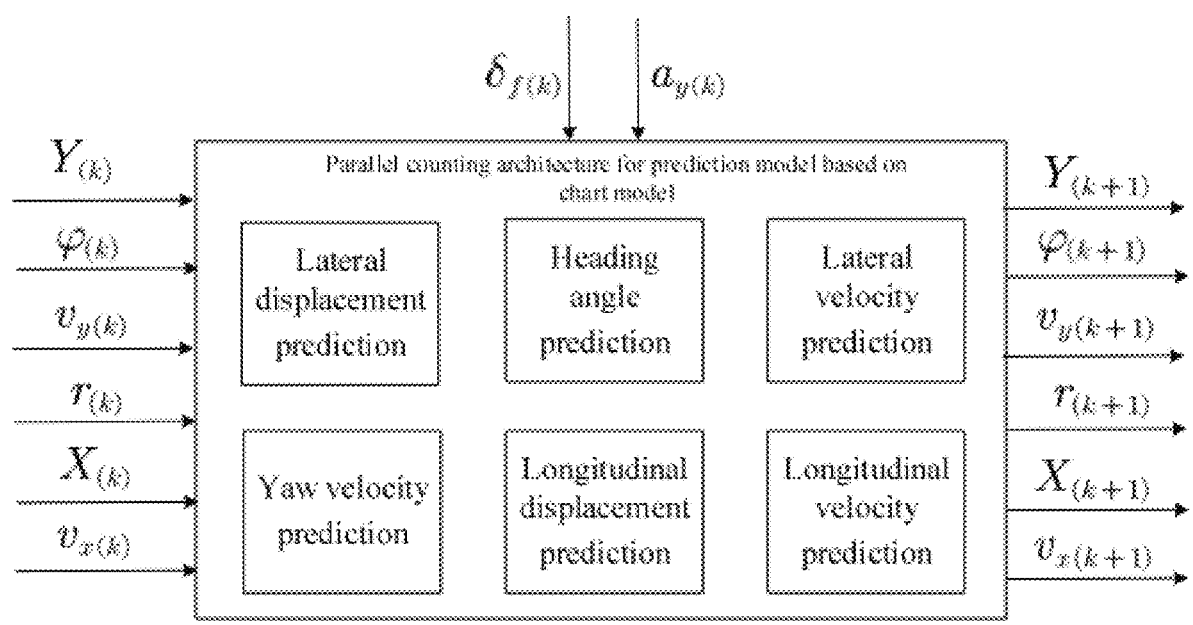
FIG. 2 is a parallel counting architecture of a prediction model based on a chart model in the present application.

As shown in FIG. 2, the parallel computing architecture for the prediction model can be obtained for parallel computing of six state amounts based on the chart model.

The lateral kinetic equation model selects a vehicle lateral displacement Y, a heading angle φ, a vehicle lateral velocity $v_y$, a yaw velocity r, a vehicle longitudinal displacement X and a vehicle longitudinal velocity $v_x$ as a state amount of a system, i.e. a state amount x=[Y φ $v_y$ r X $v_x$]; a vehicle front wheel steering angle $\delta_f$ and a longitudinal acceleration $a_x$ as an input; and a vehicle lateral displacement Y as an output of a system.

In addition, since MPC is a discrete model controller, it is necessary to discretize the above state space model. A three-stage three-section Runge-Kutta is employed in step S1 of the present invention for discretization to obtain a system discrete model.

$$\begin{cases} k_1 = T_s f(x_k, u_k) \\ k_2 = T_s f\left(x_k + \frac{1}{2}k_1, u_k\right) \\ k_3 = T_s f(x_k - k_1 + 2k_2, u_k) \\ x_{k+1} = x_k + \frac{1}{6}(k_1 + 4k_2 + k_3) \end{cases}$$

wherein $k_1$, $k_2$ and $k_3$ are intermediate variables; $T_s$ is a discrete step size; $x_k$ is a state amount at moment k; $x_{k+1}$ is a state amount at moment k+1 and $u_k$ is a control amount at moment k.

S2: taking a road center line as an ideal driving track to minimize an offset distance of a vehicle driving track from a lane center line, and building a target function by targeting at making a change in a front wheel steering angle and a longitudinal acceleration as small as possible in a driving process.

That is, it is assumed that an ideal driving track of a driver is replaced by a road center line, the target function ensures a change in a front wheel steering angle and a longitudinal acceleration as small as possible in a driving process while minimizing an offset distance of the vehicle traveling track from the lane center line and the corresponding target function J is:

$$J = \sum_{i=0}^{N-1}\left(\Delta U_{(k+i|k)}R\Delta U_{(k+i|k)}^T\right) + \sum_{i=0}^{N-1}\left((Y_{(k+i|k)} - r_{(k+1)})Q(Y_{(k+i|k)} - r_{(k+1)})^T\right) + \\ (Y_{(k+n|k)} - r_{(k+1)}^*)P(Y_{(k+N|k)} - r_{(k+1)}^*)^T$$

wherein $\Delta U_{(k+i|k)}$ is a changing amount of a control amount in step i at moment k, N is a predictive step size, P is a weight matrix of a terminal, Q is a state weight matrix, R is a weight matrix of a control amount, $Y_{(k+i|k)}$ is a vehicle lateral displacement in step i at moment k, $r_{(k+1)}$ is a yaw velocity in step k+1 and $r_{(k+1)}$* is a desired value of a yaw velocity in step k+1.

Figure 5:
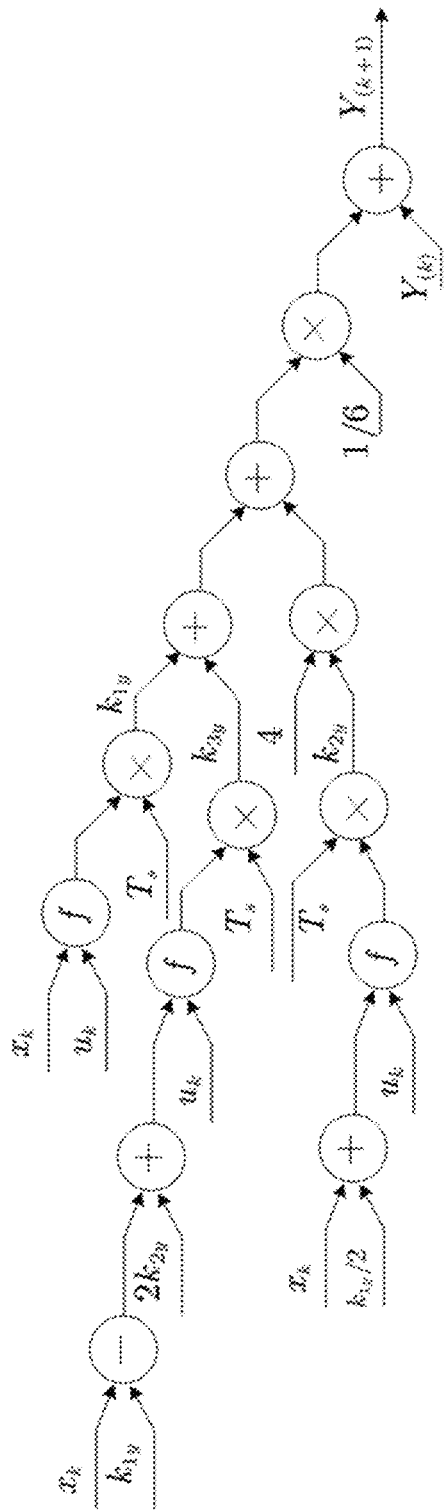
FIG. 5 is a counting diagram of a prediction model for a vehicle lateral displacement Y.

With the recursive computing of the vehicle lateral displacement Y as an example, the computing chart for the prediction model of the vehicle lateral displacement Y as shown in FIG. 5 can be drawn according to the chart counting model.

Since the state amount can be computed alone, the parallel counting architecture for the prediction model based on the chart model shown in FIG. 2 can be drawn according to the chart counting model.

S3: as shown in FIG. 3, building a parallel computing architecture of a prediction model and the target function, and employing a triggering parallel computing method by the parallel computing architecture to synchronously compute the prediction model and the target function. In the parallel computing architecture of the prediction model and the target function in the step S3, a symbol indicating that solution of the prediction model and the target function in a present computing step has been completed is used as a symbol of starting a prediction computing at a next step, thereby realizing parallel computing of the prediction model and the target function. In the embodiment, the present invention can build the parallel computing architecture for model prediction control with a multi-core single chip microcomputer as an example according to the computing chart model of model prediction control and the existing hardware parallel techniques (multi-core, multi-thread and the like).

In the process of forward recurrence, computing of the prediction model and target function is performed synchronously. Since data in parallel tasks is not completely independent, a coupling exists. However, for the prediction process of each step, data is independent of each other. In this regard, the present invention combines a triggering parallel computing manner, i.e. using a symbol indicating that solution of the prediction model and the target function in the Nth step has been completed as a symbol of starting a prediction computing at the (N+1)th step, thereby ensuring sequence of data computing and shortening the time of solving the target function.

A recurrence relationship between the lateral kinetic equation model and the target function is:

$i = 0$ $\quad J_0 = \sum_{i=0}^{N-1}\Delta U_{(k+i|k)}R\Delta U_{(k+i|k)}^T$ $\quad x_{(k+1|k)} = f(x_{(k|k)}, U_{(k|k)})$ $i = 1$ $\quad J_1 = J_0 + (Y_{(k+1|k)} - r_{(k+1)})Q(Y_{(k+1|k)} - r_{(k+1)})^T$ $\quad x_{(k+2|k)} = f(x_{(k+1|k)}, U_{(k+1|k)})$ $\vdots$ $i = N-1$ $\quad J_{N-1} = J_{N-2} + (Y_{(k+N-1|k)} - r_{(k+1)})Q(Y_{(k+N-1|k)} - r_{(k+1)})^T$ $\quad x_{(k+N|k)} = f(x_{(k+N-1|k)}, U_{(k+N-1|k)})$ $i = N$ $\quad J = J_{N-1} + (Y_{(k+N|k)} - r_{(k+1)})P(Y_{(k+N|k)} - r_{(k+1)})^T$ wherein J is a target function to be optimized, f is a lateral kinetic equation model, P is a weight matrix of a terminal, Q is a state weight matrix, R is a weight matrix of a control amount, $\Delta U_{(k+i|k)}$ is a changing amount of a control amount in step i at moment k, $x_{(k+i|k)}$ is a state amount prediction value in step i at moment k, $U_{(k+i|k)}$ is a control amount prediction value in step i at moment k, and $r_{(k+1)}$ is a yaw velocity in step k+1.

Figure 11:
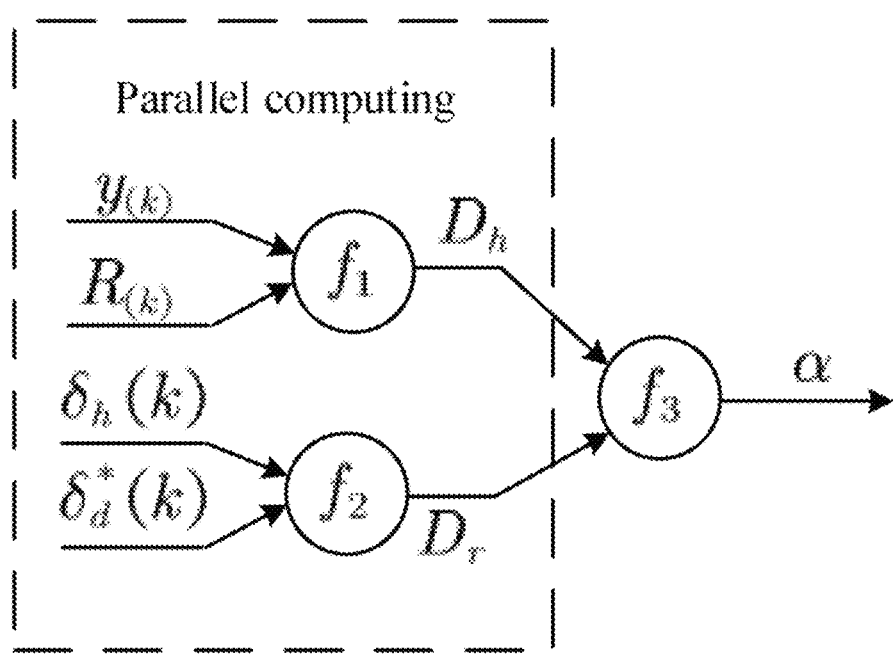
FIG. 11 is a driving weight parallel computing architecture.

In addition, in the embodiment, the present invention proposes a parallel counting architecture for parallel computing of driving weights for a driver operation risk $D_h$ and a path offset risk $D_r$ as shown in FIG. 11 according to the chart model concept, thereby shortening the time of solving the driving weight.

S4: solving and computing a gradient with a manner of back propagation and using a gradient descent method to optimize a control amount of a front wheel steering angle and a control amount of a longitudinal acceleration to obtain an optimal control amount of the front wheel steering angle and an optimal control amount of the longitudinal acceleration.

The step S4 specifically comprises:

S41: building a plurality of storage units, each storage unit storing a related computing parameter;

S42: obtaining a gradient of a target function for an input amount based on back propagation according to the computing parameter stored in each storage unit; and S43: using a gradient descent method to optimize a control amount of a front wheel steering angle and a control amount of a longitudinal acceleration of a vehicle;

$$\begin{bmatrix} \delta_{f(k|k)}, \delta_{f(k+1|k)} \cdots \delta_{f(k+N_p-1|k)} \\ a_{x(k|k)}, a_{x(k+1|k)} \cdots a_{x(k+N_p-1|k)} \end{bmatrix}$$

wherein $\delta_{f(k|k)}$, $\delta_{f(k+1|k)}$ ... $\delta_{f(k+N_p-1|k)}$ $\delta_{f(k|k)}$, $\delta_{f(k|k+1)}$ ... $\delta_{f(k|k+N-1)}$ are respectively front wheel steering angles of step 0, 1 ... $N_p-1$ at moment k, and $a_{x(k|k)}$, $a_{x(k+1|k)}$ ... $a_{x(k+N_p-1|k)}$ is respectively a longitudinal acceleration of step 0, 1 ... $N_p-1$ at moment k, when a difference value between an output result of an optimized target function $J_k$ and a result of a target function $J_{k-1}$ of a previous step size is smaller than a set value or reaches limited optimization times or ΔJ is zero, an optimization process is completed if one of the three conditions is satisfied and an optimal control sequence is $U_{(k)}^*$;

$a_{x(k|k)}^*, a_{x(k+1|k)}^* \ldots a_{x(k+N-1|k)}^*$, wherein $U_{(k|k)}^*$, $U_{(k+1|k)}^* \ldots U_{(k+N-1|k)}^*$ is respectively a desired value of a control amount of step 0, 1 ... $N_p-1$ at moment k, $\delta_{f(k|k)}^*$, $\delta_{f(k+1|k)}^*, \ldots, \delta_{f(k+N-1|k)}^*$ is respectively a desired value of a front wheel steering angle of step 0, 1 ... $N_p-1$ at moment k, and $a_{x(k|k)}^*$, $a_{x(k+1|k)}^* \ldots a_{x(k+N-1|k)}^*$ is respectively a desired value of a longitudinal acceleration of step 0, 1 ... $N_p-1$ at moment k, a computing formula of the optimal control sequence is represented as follows:

$$\delta_{f(k|k)}^* = \delta_{f(k-1|k-1)}^* - \frac{\partial J}{\partial \delta_{f(k|k)}} \Delta t \qquad a_{x(k|k)}^* = a_{x(k-1|k-1)}^* - \frac{\partial J}{\partial a_{x(k|k)}} \Delta t$$

$$\delta_{f(k+1|k)}^* = \delta_{f(k|k)}^* - \frac{\partial J}{\partial \delta_{f(k+1|k)}} \Delta t \qquad a_{x(k+1|k)}^* = a_{x(k|k)}^* - \frac{\partial J}{\partial a_{x(k+1|k)}} \Delta t$$

$$\vdots \qquad \vdots$$

$$\delta_{f(k+N-1|k)}^* = \delta_{f(k+N-2|k)}^* - \frac{\partial J}{\partial \delta_{f(k+N-1|k)}} \Delta t \quad a_{x(k+N-1|k)}^* = a_{x(k+N-2|k)}^* - \frac{\partial J}{\partial a_{x(k+N-1|k)}} \Delta t$$

wherein $\delta_{f(k-1|k-1)}^*$ is an optimal front wheel steering angle of a previous moment, $a_{x(k-1|k-1)}^*$ is an optimal longitudinal acceleration of a previous moment and Δt is a control step size, $\delta_{f(k|k)}^*$ in a first element of the obtained optimal control sequence $U_{(k)}^*$ serves as an optimal control amount of a front wheel steering angle $\delta_d^*(k)$ at moment k and participates in solution of a desired front wheel steering angle, and $a_{x(k|k)}^*$ in a first element of the optimal control sequence $U_{(k)}^*$ is a control amount of an optimal longitudinal acceleration at moment k for directly acting on an accelerator pedal.

S5: computing a driving weight based on fuzzy logic, obtaining a desired front wheel steering angle according to the driving weight and completing real time control over man-machine coordinated steering of the smart vehicle.

In a vehicle driving process, a risk mainly comprises two parts: one part from a risk existing in a state of a vehicle and the other part from a risk caused by a driver operation.

The step S5 specifically comprises:
S51: respectively computing a path offset risk and a driver operation risk of a vehicle, obtaining a path offset risk level according to a path offset risk membership function, and obtaining a driver operation risk level according to a driver operation risk membership function;
S52: building a driving weight membership function based on risk assessment and a driving weight map chart based on risk assessment, and obtaining a driving weight according to a path offset risk and a driver operation risk; and
S53: computing a desired front wheel steering angle of moment k+1 according to a driving weight;

$$\delta(k+1) = \alpha * \delta_h(k+1) + (1-\alpha) * \delta_m(k+1)$$

wherein $\delta_h(k+1)$ is a driver desired front wheel steering angle at moment k+1, $\delta_m(k+1)$ is a desired front wheel steering angle of a machine decision at moment k+1 and $\delta(k+1)$ is a front wheel steering angle executed by a desired steering system at moment k+1.

A computing formula of the path offset risk is:

$$D_r = |y_{(k)} - R_{(k)}|$$

wherein $y_{(k)}$ is a lateral displacement of a smart vehicle at moment k and $R_{(k)}$ is a lateral displacement of a lane center line at moment k.

A computing formula of the driver operation risk $D_h$ is:

$$D_h = |\delta_h(k) - \delta_d^*(k)|$$

wherein $\delta_h(k)$ is a front wheel steering angle at moment k and $\delta_d^*(k)$ is an optimal control amount of a front wheel steering angle at moment k.

Figure 6:
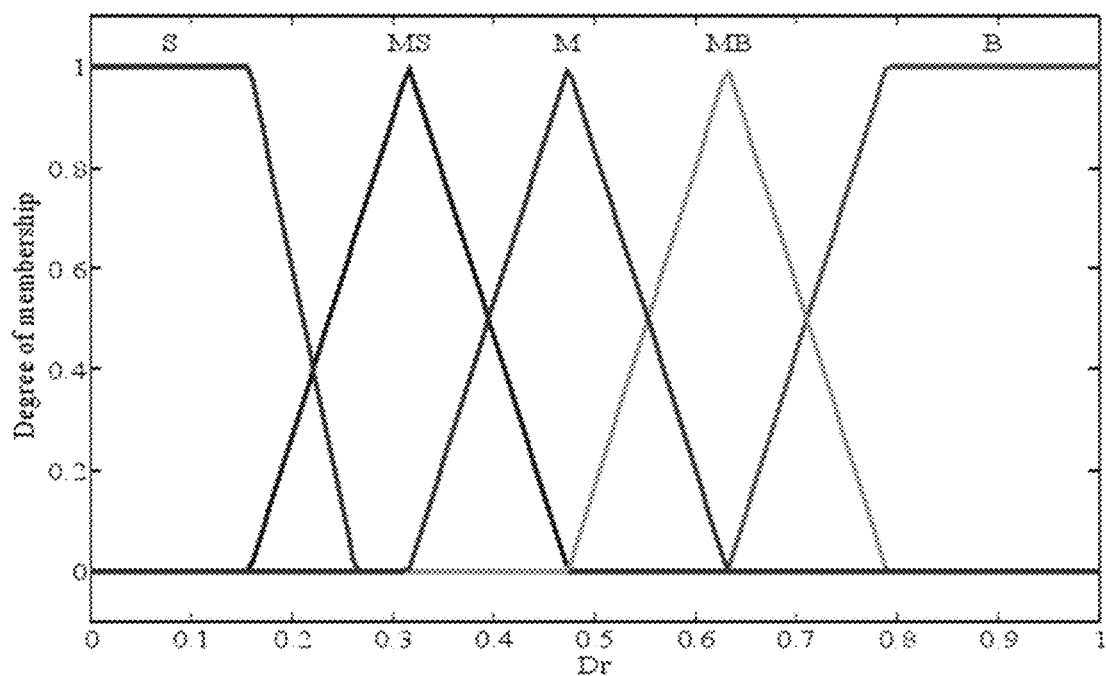
FIG. 6 is a path offset risk membership function.
Figure 7:
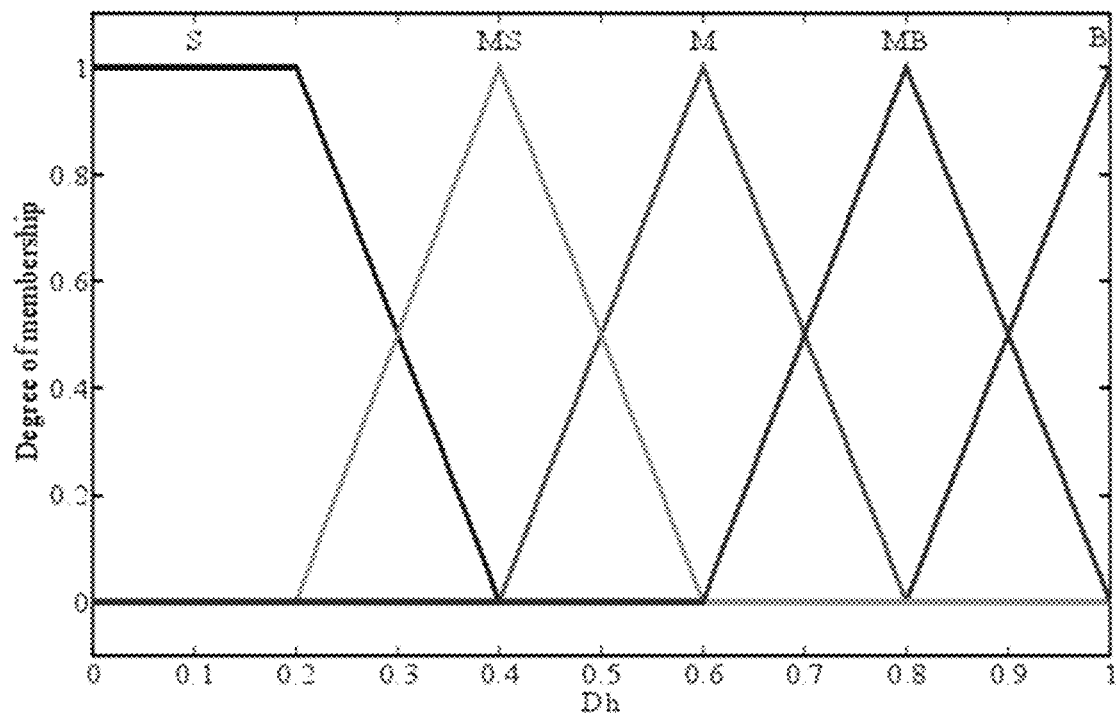
FIG. 7 is a driver operation risk membership function.
Figures 8, 9:
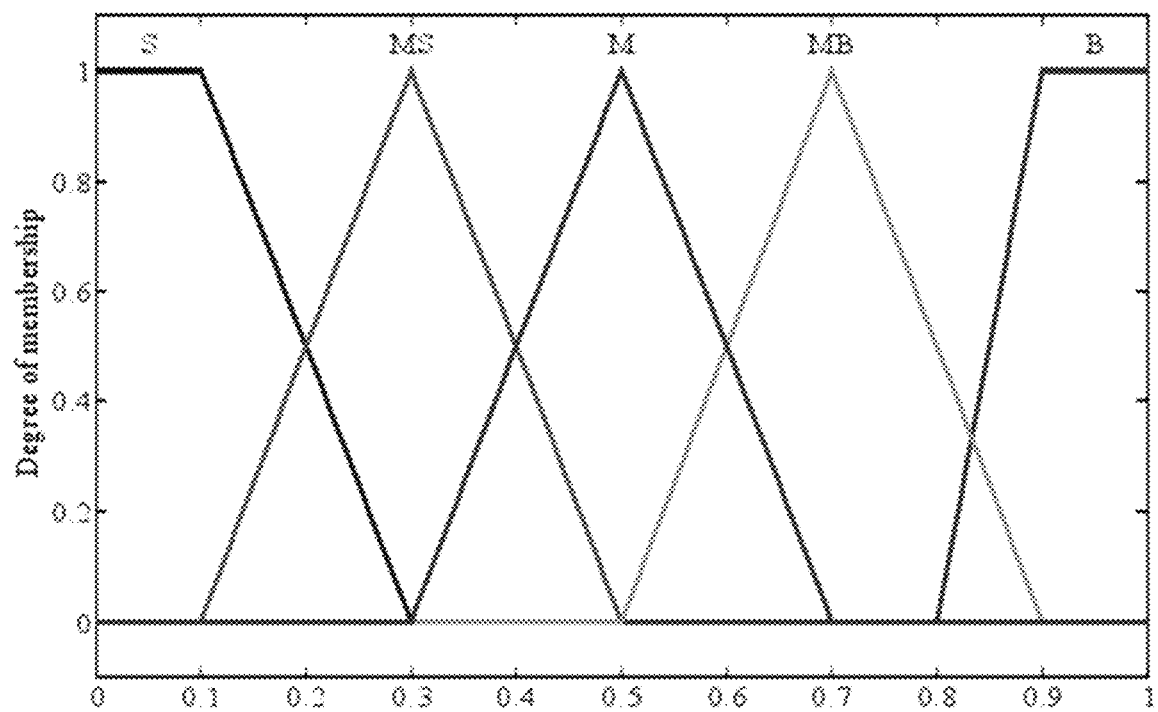
FIG. 8 is a risk assessment fuzzy rule table.
FIG. 9 is a driving weight membership function.

Specifically, in the embodiment, the path offset risk is divided into five levels: S, MS, M, MB and B. Using a triangular membership function, the path offset risk membership function as shown in FIG. 6 can be drawn. The driver operation risk is divided into five levels: S, MS, M, MB and B. Using a triangular membership function, a driver operation risk membership function shown in FIG. 7 can be drawn. When a vehicle offset degree is low, an allowable range of a driver operation risk will be large, and when a vehicle offset degree is high, an allowable range of a driver operation risk will be small and even completely shifted to a controller. Based on considerations of above characteristics, the fuzzy rule table for risk assessment shown in FIG. 8 is designed.

Figure 10:
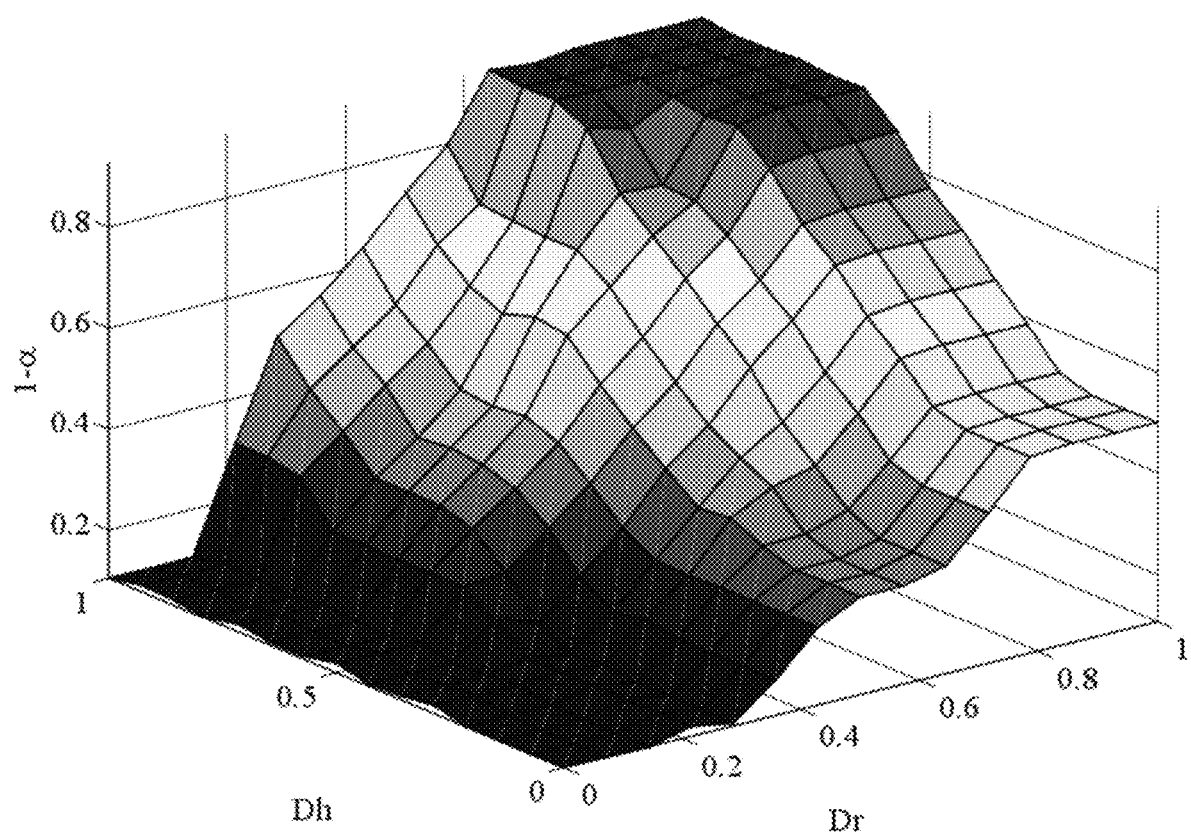
FIG. 10 is a driving weight map chart based on risk assessment.

The driving weight is also evenly split into five parts: S, MS, M, MB and B. Using a triangular membership function, the driving membership function shown in FIG. 9 can be drawn (wherein a driving right α denotes a driving weight of a driver) and the driving weight map chart based on risk assessment shown in FIG. 10 can be drawn. Through a two-dimensional look-up table of the driver operation risk $D_h$ and the driver operation risk $D_h$, the driving weight α can be obtained.

The above embodiments are merely exemplary and thus do not limit the scope of the present invention. These embodiments can also be implemented in other various manners and various omissions, replacements and modifications can be made without departing from the scope of the technical concept of the present invention.

What is claimed is:

1. A parallel computing method for a man-machine coordinated steering control of a smart vehicle based on a risk assessment, wherein the parallel computing method comprises the following steps:
S1: building a lateral kinetic equation model of a vehicle and obtaining a system discrete model of the vehicle;
S2: taking a road center line as an ideal driving track to minimize an offset distance of a vehicle driving track from a lane center line, and building a target function by targeting at making a change in a front wheel steering angle and a longitudinal acceleration as small as possible in a driving process;

S3: building a parallel computing architecture of a prediction model and the target function, and employing a triggering parallel computing method by the parallel computing architecture to synchronously compute the prediction model and the target function;

S4: solving and computing a gradient with a manner of a back propagation and using a gradient descent method to optimize a control amount of the front wheel steering angle and the control amount of the longitudinal acceleration to obtain an optimal control amount of the front wheel steering angle and the optimal control amount of the longitudinal acceleration; and S5: computing a driving weight based on fuzzy logic, obtaining a desired front wheel steering angle according to the driving weight and completing a real time control over man-machine coordinated steering of the smart vehicle in the parallel computing architecture of the prediction model and the target function in the step S3, a symbol indicating that solution of the prediction model and the target function in a present computing step has been completed is used as the symbol of starting a prediction computing at a next step, thereby realizing a parallel computing of the prediction model and the target function;

a recurrence relationship between the lateral kinetic equation model and the target function is:

$$i = 0 \qquad J_0 = \sum_{i=0}^{N-1} \Delta U_{(k+i|k)} R \Delta U_{(k+i|k)}^T$$

$$x_{(k+1|k)} = f(x_{(k|k)}, U_{(k|k)})$$

$$i = 1 \qquad J_1 = J_0 + (Y_{(k+1|k)} - r_{(k+1)})Q(Y_{(k+1|k)} - r_{(k+1)})^T$$

$$x_{(k+2|k)} = f(x_{(k+1|k)}, U_{(k+1|k)})$$

$$\vdots$$

$$i = N-1 \quad J_{N-1} = J_{N-2} + (Y_{(k+N-1|k)} - r_{(k+1)})Q(Y_{(k+N-1|k)} - r_{(k+1)})^T$$

$$x_{(k+N|k)} = f(x_{(k+N+1|k)}, U_{(k+N-1|k)})$$

$$i = N \qquad J = J_{N-1} + (Y_{(k+N|k)} - r_{(k+1)})P(Y_{(k+N|k)} - r_{(k+1)})^T,$$

wherein J is the target function to be optimized, f is a lateral kinetic equation model, P is a weight matrix of a terminal, Q is a state weight matrix, R is a weight matrix of the control amount, $\Delta U_{(k+i|k)}$ is a changing amount of the control amount in a step i at a moment k, $x_{(k+i|k)}$ is a state amount prediction value in the step i at the moment k, $U_{(k+i|k)}$ is a control amount prediction value in the step i at the moment k, and $r_{(k+1)}$ is a yaw velocity in a step k+1; Y is a vehicle lateral displacement.

2. The parallel computing method for the man-machine coordinated steering control of the smart vehicle based on the risk assessment according to claim 1, wherein the lateral kinetic equation model is:

$$\begin{cases} \dot{Y} = v_x \sin\varphi + v_y \cos\varphi \\ \dot{\varphi} = r \\ \dot{v}_y = -v_x r + \frac{2(C_f + C_r)v_y}{mv_x} + \frac{2r(aC_f - bC_r)}{mv_x} - \frac{2C_f}{m}\delta_f \\ \dot{r} = \frac{2v_y(aC_f - bC_r)}{I_z v_x} + \frac{2r(a^2 C_f + b^2 C_r)}{I_z v_x} - \frac{2aC_f}{I_z}\delta_f \\ \dot{X} = v_x \cos\varphi - v_y \sin\varphi \\ \dot{v}_x = v_y r + a_x \end{cases},$$

wherein m is a vehicle weight; r is a yaw velocity; $v_y$ is a vehicle lateral velocity; $v_x$ is a vehicle longitudinal velocity; $a_x$ is a vehicle longitudinal speed; $I_z$ is a rotational inertia of a vehicle about shaft z; a and b are respectively a distance from a vehicle centroid to a front shaft and a rear shaft of the vehicle; and wherein $C_f$ and $C_r$ respectively represent a cornering stiffness of a front wheel tire and the cornering stiffness of a rear wheel tire; $\delta_f$ is the front wheel steering angle of the vehicle; Y is a lateral displacement of the vehicle; X is a vehicle longitudinal displacement; and φ is a heading angle.

3. The parallel computing method for the man-machine coordinated steering control of the smart vehicle based on the risk assessment according to claim 2, wherein the lateral kinetic equation model selects a vehicle lateral displacement Y, a heading angle φ, the vehicle lateral velocity $v_y$, the yaw velocity r, the vehicle longitudinal displacement X and the vehicle longitudinal velocity v as a state amount of a system, i.e. the state amount x=[Y φ $v_y$ r X $v_x$]; a vehicle front wheel steering angle $\delta_f$ and the longitudinal acceleration $a_x$ as an input; and the vehicle lateral displacement as an output of the system.

4. The parallel computing method for the man-machine coordinated steering control of the smart vehicle based on the risk assessment according to claim 2, wherein the system discrete model is obtained by a discretization with a three-order three-segment Runge-Kutta formula in the step S1;

$$\begin{cases} k_1 = T_s f(x_k, u_k) \\ k_2 = T_s f\left(x_k + \frac{1}{2}k_1, u_k\right) \\ k_3 = T_s f(x_k - k_1 + 2k_2, u_k) \\ x_{k+1} = x_k + \frac{1}{6}(k_1 + 4k_2 + k_3) \end{cases},$$

wherein $k_1$, $k_2$ and $k_3$ are intermediate variables; $T_s$ is a discrete step size; $x_k$ is a state amount at the moment k; $x_{k+1}$ is the state amount at a moment k+1 and $u_k$ is the control amount at the moment k.

5. The parallel computing method for the man-machine coordinated steering control of the smart vehicle based on the risk assessment according to claim 1, wherein the target function J is:

$$J = \sum_{i=0}^{N-1} (\Delta U_{(k+i|k)} R \Delta U_{(k+i|k)}^T) + \sum_{i=0}^{N-1} \left((Y_{(k+i|k)} - r_{(k+1)})Q(Y_{(k+i|k)} - r_{(k+1)})^T\right) + (Y_{(k+n|k)} - r_{(k+1)}^*)P(Y_{(k+N|k)} - r_{(k+1)}^*)^T,$$

wherein $\Delta U_{(k+i|k)}$ is the changing amount of the control amount in step i at the moment k, N is a predictive step size, P is the weight matrix of the terminal, Q is the state weight matrix, R is the weight matrix of the control amount, $Y_{(k+i|k)}$ is the vehicle lateral displacement in step i at the moment k, $r_{(k+1)}$ is the yaw velocity in step k+1 and $r_{(k+1)}*$ is a desired value of a yaw velocity in step k+1.

6. The parallel computing method for the man-machine coordinated steering control of the smart vehicle based on the risk assessment according to claim 1, wherein the step S4 specifically comprises:
S41: building a plurality of storage units, each of the storage units storing a related computing parameter;
S42: obtaining the gradient of the target function for an input amount based on the back propagation according to the related computing parameter which is stored in each of the storage units; and
S43: using the gradient descent method to optimize the control amount of the front wheel steering angle and the control amount of the longitudinal acceleration of the vehicle;

$$\begin{bmatrix} \delta_{f(k|k)}, \delta_{f(k+1|k)} \cdots \delta_{f(k+N_p-1|k)} \\ a_{x(k|k)}, a_{x(k+1|k)} \cdots a_{x(k+N_p-1|k)} \end{bmatrix},$$

wherein $\delta_{f(k|k)}, \delta_{f(k+1|k)} \cdots \delta_{f(k+N_p-1|k)} \delta_{f(k|k)}, \delta_{f(k|k+1)} \cdots \delta_{f(k|k+N-1)}$ are respectively the front wheel steering angles of step 0, 1 ... $N_p-1$ at the moment k, $a_{x(k|k)}$, $a_{x(k+1|k)} \cdots a_{x(k+N_p-1|k)}$ is respectively the longitudinal acceleration of step 0, 1 ... $N_p-1$ at the moment k,
when a difference value between an output result of an optimized target function $J_k$ and a result of the target function $J_{k-1}$ of a previous step size is smaller than a set value or reaches limited optimization times or $\Delta J$ is zero, an optimization process is completed if one of three conditions is satisfied and an optimal control sequence is $U_{(k)}*$:

$$a_{x(k|k)}*, a_{x(k+1|k)}* \cdots a_{x(k+N-1|k)},$$

wherein $U_{(k|k)}*, U_{(k+1|k)}* \ldots U_{(k+N-1|k)}*$ is respectively a desired value of the control amount of step 0, 1 ... $N_p-1$ at the moment k, $\delta_{f(k|k)}*, \delta_{f(k+1|k)}*, \ldots, \delta_{f(k+N-1|k)}*$ is respectively a desired value of the front wheel steering angle of step 0, 1 ... $N_p-1$ at the moment k, $a_{x(k|k)}*, a_{x(k+1|k)}* \ldots a_{x(k+N-1|k)}*$ is respectively a desired value of the longitudinal acceleration of step 0, 1 ... $N_p-1$ at the moment k,
a computing formula of the optimal control sequence is represented as follows:

$$\delta^*_{f(k|k)} = \delta^*_{f(k-1|k-1)} - \frac{\partial J}{\partial \delta_{f(k|k)}} \Delta t \qquad a^*_{x(k|k)} = a^*_{x(k-1|k-1)} - \frac{\partial J}{\partial a_{x(k|k)}} \Delta t$$

$$\delta^*_{f(k+1|k)} = \delta^*_{f(k|k)} - \frac{\partial J}{\partial \delta_{f(k+1|k)}} \Delta t \qquad a^*_{x(k+1|k)} = a^*_{x(k|k)} - \frac{\partial J}{\partial a_{x(k+1|k)}} \Delta t$$

$$\vdots \qquad\qquad \vdots$$

$$\delta^*_{f(k+N-1|k)} = \delta^*_{f(k+N-2|k)} - \frac{\partial J}{\partial \delta_{f(k+N-1|k)}} \Delta t \quad a^*_{x(k+N-1|k)} = a^*_{x(k+N-2|k)} - \frac{\partial J}{\partial a_{x(k+N-1|k)}} \Delta t,$$

wherein $\delta_{f(k-1|k-1)}*$ is an optimal front wheel steering angle of a previous moment, $a_{x(k-1|k-1)}*$ is an optimal longitudinal acceleration of the previous moment and $\Delta t$ is a control step size, $\delta_{f(k|k)}*$ in a first element of the optimal control sequence $U_{(k)}*$, which is obtained, serves as the optimal control amount of the front wheel steering angle $\delta_d*(k)$ at the moment k and participates in a solution of the desired front wheel steering angle, and $a_{x(k|k)}*$ in the first element of the optimal control sequence $U_{(k)}*$ is the control amount of the optimal longitudinal acceleration at the moment k for directly acting on an accelerator pedal.

7. The parallel computing method for the man-machine coordinated steering control of the smart vehicle based on the risk assessment according to claim 1, wherein the step S5 specifically comprises:
S51: respectively computing a path offset risk and a driver operation risk of the vehicle, obtaining a path offset risk level according to a path offset risk membership function, and obtaining a driver operation risk level according to a driver operation risk membership function;
S52: building a driving weight membership function based on the risk assessment and a driving weight map diagram based on the risk assessment, and obtaining the driving weight according to the path offset risk and the driver operation risk; and
S53: computing the desired front wheel steering angle of a moment k+1 according to the driving weight;

$$\delta(k+1) = \alpha*\delta_h(k+1) + (1-\alpha)*\delta_m(k+1),$$

wherein $\delta_h(k+1)$ is a driver desired front wheel steering angle at the moment k+1, $\delta_m(k+1)$ is the desired front wheel steering angle of a machine decision at the moment k+1 and $\delta(k+1)$ is the front wheel steering angle executed by a desired steering system at the moment k+1.

8. The parallel computing method for the man-machine coordinated steering control of the smart vehicle based on the risk assessment according to claim 7, wherein a computing formula of the path offset risk is:

$$D_r = |y_{(k)} - R_{(k)}|$$

wherein $y_{(k)}$ is a lateral displacement of the smart vehicle at a moment k and $R_{(k)}$ is a lateral displacement of the lane center line at the moment k.

9. The parallel computing method for the man-machine coordinated steering control of the smart vehicle based on the risk assessment according to claim 7, wherein a computing formula of the driver operation risk $D_h$ is:

$$D_h = |\delta_h(k) - \delta_d*(k)|$$

wherein $\delta_h(k)$ is the front wheel steering angle at a moment k and $\delta_d*(k)$ is the optimal control amount of the front wheel steering angle at the moment k.

* * * * *